United States Patent [19]
Boulos et al.

[11] Patent Number: 5,776,845
[45] Date of Patent: Jul. 7, 1998

[54] HIGH TRANSMITTANCE GREEN GLASS WITH IMPROVED UV ABSORPTION

[75] Inventors: Edward Nashed Boulos, Troy, Mich.; James Victor Jones, Toledo, Ohio

[73] Assignee: Ford Motor Company, Dearborn, Mich.

[21] Appl. No.: 767,768

[22] Filed: Dec. 17, 1996

Related U.S. Application Data

[63] Continuation-in-part of Ser. No. 762,474, Dec. 9, 1996, abandoned.

[51] Int. Cl.$^6$ .................................................. C03C 3/087
[52] U.S. Cl. ........................ 501/70; 501/64; 501/71; 501/904; 501/905
[58] Field of Search ..................... 501/64, 68, 70, 501/71, 72, 904, 905

[56] References Cited

U.S. PATENT DOCUMENTS

| | | |
|---|---|---|
| 2,360,280 | 10/1944 | Rolph et al. . |
| 3,481,750 | 12/1969 | Swain . |
| 3,779,733 | 12/1973 | Janakirama-Rao . |
| 4,701,425 | 10/1987 | Baker et al. . |
| 4,792,536 | 12/1988 | Pecoraro et al. . |
| 5,013,487 | 5/1991 | Cheng . |
| 5,112,778 | 5/1992 | Cheng et al. . |
| 5,214,008 | 5/1993 | Beckwith et al. . |
| 5,240,886 | 8/1993 | Gulotta et al. . |
| 5,320,986 | 6/1994 | Taniguchi et al. . |
| 5,346,867 | 9/1994 | Jones et al. . |
| 5,362,689 | 11/1994 | Morimoto et al. ........... 501/70 |
| 5,385,872 | 1/1995 | Gulotta et al. . |
| 5,558,942 | 9/1996 | Itoh et al. . |
| 5,565,388 | 10/1996 | Krumwiede et al. ........... 501/70 |
| 5,593,929 | 1/1997 | Krumwiede et al. ........... 501/70 |

FOREIGN PATENT DOCUMENTS

| | | |
|---|---|---|
| 289990 | 12/1970 | Russian Federation . |
| 2 162 835 | 2/1986 | United Kingdom . |

*Primary Examiner*—Karl Group
*Attorney, Agent, or Firm*—Lorraine S. Melotik

[57] ABSTRACT

The invention is a green soda-lime-silica glass composition having excellent ultra violet absorbing ability while having a relatively high light transmittance. The colorants of the glass composition consist essentially of: greater than 0.5 to 1.5 wt. % total iron oxide as $Fe_2O_3$; wherein the weight ratio of $Fe^{+2}/Fe^{+3}$ is less than 0.35; 0.10 to 2.00 wt. % manganese compound as $MnO_2$; and optionally any of: up to 1.00 wt. % titanium oxide as $TiO_2$, up to 1.00 wt. % cerium oxide as $CeO_2$; up to 1.00 wt. % vanadium oxide as $V_2O_5$; and up to 0.20 wt. % chromium oxide as $Cr_2O_3$; the glass composition having, at 4.0 mm. thickness: 55 to 80% light transmittance using Illuminant A with less than 46% ultra violet transmittance measured over the range of 300 to 400 nanometers.

32 Claims, No Drawings

HIGH TRANSMITTANCE GREEN GLASS WITH IMPROVED UV ABSORPTION

This application is a continuation-in-part application of U.S. Ser. No. 08/762,474, filed Dec. 9, 1996 now abandoned having the same inventorship and title and being commonly assigned therewith.

The invention is directed to a green glass having improved UV absorption and high visible light transmittance. More particularly, it is a soda-lime-silica glass whose colorants are iron oxide and a manganese compound such as manganese oxide, and optionally any of titanium oxide, cerium oxide, vanadium oxide, and chromium oxide.

BACKGROUND OF THE INVENTION

As is well known in the art, iron oxide is commonly used to provide a green color to glass. In the glass, the iron oxide exists in two chemical forms, an oxidized form: $Fe_2O_3$ wherein the iron is $Fe^{+3}$ and a reduced form: FeO wherein the iron is $Fe^{+2}$. Advantageously, the oxidized form of iron oxide absorbs a portion of the ultra violet (UV) light passing through the glass product and the reduced form absorbs a portion of the infra red (IR) light passing through the glass product. As would be appreciated, the UV and IR light absorption properties of iron oxide are especially valuable when the glass is used in automobiles. When heat is absorbed by the glass, the load on air conditioners is initially reduced and there is less total heat in the vehicle to cool. When the ultra violet absorption is improved, there is less damage over time to the colors of the components inside the vehicle and provides for more passenger comfort. Therefore, controlling these spectral properties of the glass is very important.

Under composition batching and furnace firing conditions generally used in the glass industry, if the total iron oxide as $Fe_2O_3$ in the glass composition is within about 0.3 to 2.0 wt. %, the iron oxide equilibrium provides a $Fe^{+2}/Fe^{+3}$ weight ratio greater than 0.35. Adding iron oxide to the glass under normal furnace conditions improves both the UV and the infrared absorption of the glass since the concentration of the iron forms is correspondingly increased, but this improvement is at the expense of visible transmittance. That is, as iron oxide is added the color of the glass darkens so that the visible transmittance is correspondingly decreased.

It would be extremely advantageous to improve the UV absorption of green glass products while maintaining a high level of visible transmission and to also have a good absorption in the IR portion of the spectrum. These advantages could possibly be obtained by including more iron oxide in the glass composition while providing a more oxidizing environment in the glass furnace to shift the iron oxide towards its oxidized form. This would increase the UV absorption of the glass. And by shifting the iron oxide away from its darker reduced form towards the oxidized form, even more iron oxide perhaps could be added to the batch to further improve UV and IR light absorption. All of this could possibly be done while still maintaining good visible transmittance properties of the glass.

One way commonly employed to shift towards a more oxidizing environment in the glass furnace is by providing additional air to the glass melt in the furnace. Increasing the amount of air, however, has several undesirable consequences: the furnace cools down, the combustion heating of the furnace becomes inefficient which requires a fuel gas increase and also the increased oxygen can promote the formation of undesirable NOx emissions in the combustion products.

Sodium sulfate, a fining agent often added to the glass melt to remove bubbles from the glass, can also act as an oxidizing agent. Increasing the sodium sulfate in the glass batch in an amount to effectively oxidize the batch, however, is also less than desirable. Excess sodium sulfate can generate undesirable $SO_x$ emissions once the saturation point of solubility of sulfate in the glass melt is reached. Anthracite coal (a reductant) is another material typically used in glass melts along with sodium sulfate. It causes sodium sulfate to break down into sodium oxide which becomes part of the glass and sulfur trioxide which generates the fining action to remove bubbles in the melt. The glass batch can be made oxidizing by simply removing the coal from the batch, but then the break down of the sodium sulfate requires that the temperature in the furnace be raised which makes for less efficient furnace operation. Generally, increasing the quantity of sodium sulfate in the glass tends to shift the iron oxide equilibrium toward oxidizing while increasing carbon concentration in the glass batch shifts the iron oxide equilibrium toward reducing. Furnace temperature also affects iron oxide equilibrium. Increased temperature shifts the iron oxide toward the reduced state and lowering overall furnace temperature allows the iron oxide to move toward the oxidized state. Generally lowering furnace temperatures, however, can potentially lead to defects in the final glass product.

An often used and well known oxidizing material, sodium nitrate, can also be added to the glass batch to shift the iron oxide towards its oxidized form. It is only effective, however, as an oxidizer in the early stages of glass melting which limits control of the iron oxide redox equilibrium. Another more negative aspect of using sodium nitrate is that environmentally undesirable nitrogen oxide (NOx) emissions are generated. Thus, attempting to shift the redox equilibrium toward the oxidized iron oxide form by using sodium nitrate is less than satisfactory for several reasons.

As it can be clearly appreciated from the above discussions, there are significant difficulties associated with providing and maintaining particular oxidizing conditions in a glass melt furnace to control the redox ratio of the iron oxide. To avoid these difficulties, UV absorbing materials like oxides of cerium, titanium, vanadium, and chromium are often added to the glass batch to increase the UV absorption of the glass. When used, however, they are included in the glass in very small quantities which only provide limited UV improvement. One reason for using only small quantities is that some of these additives are very expensive. Cerium oxide, in particular, can more than double the batch cost when used in a sufficient quantity to adequately improve the ultra violet absorption of glass products. Titanium dioxide is less expensive than cerium oxide but is still much more expensive than iron oxide. Chromium oxide must also be used in extremely small quantities because while the oxidized form of chromium oxide absorbs in the ultra violet portion of the spectrum, the reduced form of chromium absorbs in the visible portion of the spectrum causing a loss of the visible transmission and much stronger color in the glass product. Vanadium oxide also has been known to deteriorate furnace refractories. Therefore the improvement in UV absorption that can be obtained by using such additives is commercially limited.

We have found that we can overcome the above discussed problems associated with improving UV absorption of a green glass. In the present invention we have found a unique and commercially desirable way to improve the UV and the IR absorbing properties of a green glass composition while maintaining desirable visible light transmittance. We do this by including manganese compounds like manganese dioxide in the glass melt along with the iron oxide. It is an excellent and inexpensive oxidizer of the glass melt which avoids the drawbacks of prior art oxidizers like sodium nitrate. In our invention, the desired oxidizing conditions can be obtained without the use of any sodium nitrate. Manganese dioxide has often been specifically excluded from use in many prior glass compositions because it was repeatedly disclosed to cause solarization, i.e., discoloration of the glass with exposure to UV light. We have found that in our present invention composition solarization is not a problem even though a manganese compound is included.

In U.S. Pat. No. 5,346,867, having the same inventorship and being commonly assigned with the present invention, we describe a method of making a dark neutral gray glass which includes manganese oxide for selenium retention during processing. That glass further included cobalt and iron oxide as colorants. In U.S. patent application Ser. No. 08/691,958 filed Aug. 5, 1996 and entitled "Reduction of Nickel Sulfide Stones In Glass", also having common inventorship and ownership with the present invention, a method is disclosed which involves using a manganese compound to prevent the formation of nickel sulfide stones by encouraging an oxidizing environment in the glass melt.

SUMMARY OF THE INVENTION

The present invention is a green soda-lime-silica glass composition that is heat absorbing and has improved ultra violet light absorption. Including a manganese compound in the glass melt forces the glass composition batch towards strongly oxidizing furnace conditions so that the iron oxide in the melt is directed toward its oxidized form. The composition comprises 68 to 75% $SiO_2$, 10 to 18% $Na_2O$, 5 to 15% CaO, 0 to 10% MgO, 0 to 5% $Al_2O_3$, and 0 to 5% $K_2O$, where CaO+MgO is 6 to 15% and $Na_2O+K_2O$ is 10 to 20%, and colorants consisting essentially of: greater than 0.5 to 1.5 wt. % total iron oxide as $Fe_2O_3$ wherein the weight ratio of $Fe^{+2}/Fe^{+3}$ is less than 0.35; 0.10 to 2.00 wt. % manganese compound as $MnO_2$; up to 1.00 wt. % titanium oxide as $TiO_2$; up to 1.00 wt. % cerium oxide as $CeO_2$; up to 1.00 wt. % vanadium oxide as $V_2O_5$; and up to 0.20 wt. % chromium oxide as $Cr_2O_3$.

Glass products made according to embodiments of the invention have the following spectral properties at 4.0 mm. thickness: 55 to 80% light transmittance using Illuminant A (LTA) and less than 46% ultra violet (UV)transmittance measured over the range of 300 to 400 nanometers. Generally, as the quantities of the colorants increase, both the % LTA and % UV transmittance will go down. Similarly, as the glass thickness increases for a given glass composition, the transmittance of the thicker glass decreases. Preferably, the dominant wavelength is between 500 and 570 nanometers.

According to another aspect of the invention, it is a method for improving the ultraviolet light absorption while maintaining high visible light transmittance of a soda-lime-silica green glass composition using iron oxide as a colorant by including a manganese compound along with the iron oxide during melt processing of the glass composition. The method comprises admixing components which result in the glass composition disclosed above.

We have unexpectedly discovered an advantageous way to improve ultra violet light absorption in green glass products while maintaining good visible transmission and, at the same time, improving absorption in the infra red portion of the spectrum. All of this has remarkably been accomplished in a low cost and environmentally friendly way by using manganese compounds in the glass composition batch along with the iron oxide colorant. Advantageously, by introducing a manganese compound like $MnO_2$ to a glass batch containing iron oxide we can shift the iron oxide toward the oxidized state such that the ratio of $Fe^{+2}/Fe^{+3}$ is less than 0.35. This improves the UV absorption of the glass. And because the iron oxide is shifted to its less colorless (oxidized) form, more iron oxide can be added to provide additional enhancement of IR absorption in the glass without decreasing the transmission properties of the glass. Desirably, the significant expense of using the necessary quantities of any of cerium, titanium, vanadium, and chromium oxides which would be necessary to obtain the same improved UV properties as provided by the present invention use of manganese oxide is avoided. Additionally, the use of manganese compounds avoids the commercially undesirable aspects of prior ways of generating an oxidizing environment in the glass melt batch as currently often done with sodium nitrate. We have found that while sodium nitrate can still be incorporated in our glass melt, it provides no sustainable oxidizing benefits. Hence, from various perspectives, it is most desired not to include any sodium nitrate in the present glass compositions. These and still other advantages of the present invention will become apparent from the detailed description.

DETAILED DESCRIPTION OF THE INVENTION

Flat soda-lime-silica glass, used in the automotive and architectural industries and conveniently made by the float glass process, is generally characterized by the following basic composition shown in Table I, the amounts of the components being based on a weight percentage of the total glass composition:

TABLE I

| Base Glass Components | Weight % |
| --- | --- |
| $SiO_2$ | 68 to 75 |
| $Al_2O_3$ | 0 to 5 |
| CaO | 5 to 15 |
| MgO | 0 to 10 |
| $Na_2O$ | 10 to 18 |
| $K_2O$ | 0 to 5 |

The green glass composition of the present invention employs this basic soda-lime-silica glass composition wherein, additionally, CaO+MgO is 6 to 15% and $Na_2O+K_2O$ is 10 to 20%. In addition, the coloring components of green glass composition consists essentially of: (i) greater than 0.5 and up to 1.5 wt. % total iron oxide as $Fe_2O_3$, where the weight ratio of $Fe^{+2}/Fe^{+3}$ is less than 0.35; (ii) manganese compound; and (iii) optionally any of titanium dioxide, cerium oxide, vanadium oxide, and chromium oxide. As would be known in the art, melting and refining aids are routinely included in glass manufacture and may also be used herein. One refining aid generally used to remove bubbles from the glass is sodium sulfate which results in $SO_3$ in the glass. Preferably $SO_3$ is present in the glass composition at 0.10 to 0.30 wt. %, more preferably 0.14 to 0.25 wt. %.

Glass products made according to embodiments of the invention have the following spectral properties at 4.0 mm. thickness: 55 to 80% light transmittance using Illuminant A (LTA) and less than 46% ultra violet (UV)transmittance measured over the range of 300 to 400 nanometers. All of the examples herein use this range for the UV transmittance. In the examples, IR transmittance is measured over 760 to 2120 nanometers. The total iron oxide as $Fe_2O_3$ is present in the invention composition in quantities of 0.5 to 1.5 weight %, more preferably being 0.7 to 1.2 weight percent. All weight percents herein being based on the total weight of the invention glass composition. Typically, this ingredient is added into the batch ingredients in the oxide form, $Fe_2O_3$. As discussed above, iron oxide exists in two forms in the glass melt. The oxidized form of iron oxide absorbs UV light and the reduced form of iron oxide absorbs infra red light, hence lowering their transmittance through the glass products. When iron oxide is used in a glass composition in normal commercial production, the ratio of the reduced iron/oxidized iron: $Fe^{+2}/Fe^{+3}$, is at least 0.35, typically being 0.35 to 0.40. In the present invention, however, where the oxidizing conditions of the glass melt have been enhanced through the use of a manganese compound, the weight ratio of $Fe^{+2}/Fe^{+3}$ is less than 0.35, preferably being less than 0.35 to about 0.20. Even more preferably this ratio is 0.30 to 0.20, the most optimal being about 0.25 to 0.20. A wt. ratio of $Fe^{+2}/Fe^{+3}=0.35$ is equal to the wt. ratio FeO/total iron (as $Fe_2O_3$)=0.233, often used in the industry to designate redox conditions.

As disclosed above, in order to enhance the oxidizing conditions in the glass melt, a manganese compound is added to the glass composition. The manganese compound is present in the invention composition in an amount of 0.10 to 2.0 wt. % based on $MnO_2$, more preferably being 0.2 to 0.8 wt %. This manganese compound can be added to the batch glass components in a variety of forms, for example, but not limited to, $MnO_2$, $Mn_3O_4$, MnO, $MnCO_3$, $MnSO_4$, $MnF_2$, $MnCl_2$, etc. As would be appreciated, a mixture of such compounds may also be employed. In the glass composition, this compound is generally present in the $Mn^{+2}$ and $Mn^{+3}$ state, although it may additionally be present in other states such as $Mn^{+4}$. As disclosed above, the manganese compound, for example, manganese dioxide acts as an oxidizer to the iron oxide such that redox equilibrium of the iron oxide is shifted toward its oxidized form, $Fe_2O_3$. Manganese dioxide and iron oxide interact with each other in the glass melt according to the following reactions:

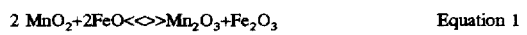
$2\ MnO_2 + 2FeO \Longleftrightarrow Mn_2O_3 + Fe_2O_3$  Equation 1

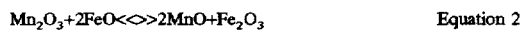
$Mn_2O_3 + 2FeO \Longleftrightarrow 2MnO + Fe_2O_3$  Equation 2

Thus, manganese dioxide is added to the glass batch, the equilibrium in Equation 1 is shifted toward the right. Furthermore, the reaction proceeds as in Equation 2 toward the right again and the net result is that more of the iron oxide is shifted toward the oxidized form ($Fe_2O_3$) while the manganese oxide is changed to its reduced (colorless) MnO form. If $Mn_2O_3$ is used as the initial batch component, then the reaction follows Equation 2. Since the manganese compound, when added to glass batches containing iron oxide is reduced towards its colorless form and as well the iron oxide is shifted away from its darker reduced form (FeO), more iron oxide may be added to the batch to enhance both the ultraviolet and the infra red absorption while simultaneously maintaining a high visible transmittance. For example, a green glass using iron oxide as a colorant ordinarily has a UV transmittance of about 51% at 80% LTA. A present invention embodiment of similar color appearance can be made having at 80% LTA a UV transmittance of less than 46%. It is expected that the other manganese compounds like $MnCl_2$ while oxidizing the batch composition would also be converted to the colorless MnO form in the presence of oxygen in the batch environment. Preferably it is most desirable to use the manganese oxide or manganese carbonate compounds in the batch.

As discussed above, the use of a manganese compound to oxidize the iron oxide of the glass composition avoids the drawbacks inherent in using the conventional oxidizer, sodium nitrate. That is, the generation of nitrogen oxide emissions from the sodium nitrate is avoided and the manganese compound is able to provide a more robust oxidizing environment than does sodium nitrate. While this invention composition is not meant to exclude the use of sodium nitrate during processing, we have found that its use provides no sustainable benefit. We have found that when sodium nitrate is used in the batch, sodium sulfate must be lowered and may adversely affect the fining action of sodium sulfate. Hence, it is most desirable to limit or exclude the addition of sodium nitrate to the glass melt during processing. In general, if sodium sulfate is included, it would optimally be in an amount less than 5 pounds per 1000 pounds of sand.

As is known in the industry, when making soda-lime-silica glass compositions, titanium dioxide generally enters as an impurity from the raw materials, e.g., with the sand, dolomite or limestone. The level of impurity that generally is present ranges normally from about 0.015 to about 0.05 wt. %, depending of the source of the raw materials. Typically about 0.02 wt. % of titanium oxide will be present in the glass even when no titanium oxide has been intentionally added as a colorant to the glass melt. Other raw materials may, however, not include any of this impurity. Commercially suitable sources of raw materials, however, containing less or no titanium dioxide would of course yield glass compositions with correspondingly reduced titanium dioxide content. $TiO_2$ may be added in an amount to provide up to 1.00 wt. % titanium dioxide. Generally if titanium dioxide is added as a colorant, the glass composition more preferably includes about 0.1 to 0.5 wt. %. The glass composition may optionally include other UV absorbers in the invention composition: up to 1.00 wt. % cerium oxide as $CeO_2$ (preferably being 0.1 to 0.5 wt. % when included); up to 1.00 wt. % vanadium oxide as $V_2O_5$; and up to 0.20 wt. % chromium oxide. As discussed above in detail, since UV additives have drawbacks, e.g., titanium oxide or cerium oxide being relatively expensive, they would not generally be added to the glass composition.

The following table lists ingredients which are preferably used to form the embodiments of green glass compositions according to the present invention.

TABLE II

| BATCH MATERIALS | RANGE MASS (LBS.) |
| --- | --- |
| SAND | 1000 |
| SODA ASH | 290 TO 350 |
| DOLOMITE | 215 TO 260 |
| LIMESTONE | 70 TO 90 |
| SALT CAKE | 6 TO 24 |
| ROUGE (97% $Fe_2O_3$) | 5 TO 20 |
| MANGANESE DIOXIDE | 1.3 TO 26 |
| TITANIUM DIOXIDE | 0 TO 14 |
| CERIUM OXIDE | 0 TO 14 |
| VANADIUM PENTOXIDE | 0 TO 14 |
| CHROMIUM OXIDE | 0 TO 1.4 |
| CARBOCITE | 0 TO 2 |
| NEPHELINE SYENITE | 0 TO 150 |

In order to demonstrate the advantages of the present invention, glass melts detailed in all of the examples were made in the laboratory according to the following procedure: batches were weighed, placed into a glass jar about 2" high and 2" inside diameter and dry mixed for 10 minutes each on a Turbula mixer, dry batch was placed into an 80% platinum/20% rhodium crucible that stands 2" tall and has an inside diameter at the top of 2.5" and is tapered to the base which has an inside diameter of 1.75". An amount of 4.5 ml.

of water is added to the dry batch in the crucible and mixed with a metal spoon. After such preparation, a group of six different batches is melted in a gas/air fired furnace at the same time for 1 hour at 2600° F. and each crucible is removed in turn from the furnace and fritted. Friting the glass involves coating the inside of the platinum/rhodium crucible with the molten glass and then plunging the crucible into cold water.

Table III shows the improvement of the ultra violet absorption of embodiments of present invention glass compositions as the iron oxide is shifted to its oxidized form by the addition of varying amounts of manganese dioxide. In particular, Table III below shows the improvements in ultra violet absorption with increasing $MnO_2$ at a constant level of 0.90 wt. % $Fe_2O_3$. In both table III and IV, no $TiO2$ was added to the glass, but it was present as an impurity in the glass at a level of about 0.02 wt. %, having come in with raw materials.

TABLE III

|  | Ex. 1 | Ex. 2 | Ex. 3 | Ex. 4 | Ex. 5 | Ex. 6 | Ex. 7 |
|---|---|---|---|---|---|---|---|
| Wt. % $Fe_2O_3$ | 0.900 | 0.900 | 0.900 | 0.900 | 0.900 | 0.900 | 0.900 |
| Wt. % FeO | 0.207 | 0.193 | 0.186 | 0.180 | 0.167 | 0.174 | 0.172 |
| $Fe^{+2}/Fe^{+3}$ | 0.343 | 0.314 | 0.299 | 0.286 | 0.260 | 0.273 | 0.269 |
| Wt. % $MnO_2$ | 0.0 | 0.1 | 0.2 | 0.4 | 0.6 | 0.8 | 1.0 |
| % LTA | 71.5 | 72.6 | 72.8 | 72.9 | 72.6 | 72.1 | 72.0 |
| % UV | 36.5 | 35.2 | 32.9 | 30.5 | 27.4 | 25.0 | 22.9 |
| % IR | 23.3 | 25.4 | 26.5 | 27.5 | 29.7 | 28.5 | 28.8 |
| % TSET | 44.8 | 46.3 | 46.8 | 47.1 | 47.9 | 46.8 | 46.7 |
| Dom. Wavelength | 505.4 | 509.1 | 520.5 | 537.9 | 550.3 | 553.7 | 557.2 |
| % Excitation Purity | 2.6 | 2.4 | 2.4 | 3.4 | 5.1 | 6.2 | 7.6 |

After removing the crucible from the water and draining the water, the broken glass particles are removed from the sides of the crucible and mechanically mixed inside the crucible. All six samples are fritted in like manner and all crucibles are placed back into the furnace for another 1 hour interval at 2600° F. and the fritting procedure is repeated. After the second fritting process, the crucibles are returned to the furnace for 4 hours at 2600° F. Each crucible is removed in turn from the furnace and each molten glass sample is poured into a graphite mold with an inside diameter of 2.5". Each glass is cooled slowly, labeled, and placed into an annealing furnace where the temperature is quickly raised to 1050° F., held for 2 hours, and then slowly cooled by shutting off the furnace and removing the samples after 14 or more hours. The samples are ground and polished to about 4.0 mm. thickness and subsequently the spectral properties are measured for each sample.

All the laboratory melts made with the above procedure use a base composition of 100 grams sand, 32.22 grams of soda ash, 8.81 grams of limestone, 23.09 grams of dolomite, 1.5 grams of sodium sulfate, 0.075 grams of carbocite, 2.64 grams of nepheline syenite, and the remainder of the batch includes rouge, manganese dioxide, and titanium dioxide and cerium oxide, in some example melts. Sodium nitrate was not included as a component in any of the examples. Chromium oxide and vanadium pentoxide, not shown in the example melts, can also be incorporated into a glass melt as is well known to those skilled in the art. Use of additives like titanium dioxide, cerium oxide, and chromium oxide are well known to improve ultra violet absorption in glass and would be useful to improve ultra violet absorption, if desired, beyond that obtained with only manganese dioxide.

From Table III, it can be readily seen that the addition of manganese dioxide significantly improves the ultra violet absorption of the present invention iron oxide containing glasses. Most desirably, in addition to the significant improvement in the ultra violet absorption of the glass, the invention also improves the visible transmittance of the glass, as evidenced by the increase of the % LTA.

While Table III showed the improvement in ultra violet absorption of present invention glasses with constant total iron when the MnO2 was increased, Table IV shows the change in ultra violet absorption when a constant amount of $MnO_2$ (0.60 wt. %) is added to various concentrations of $Fe_2O_3$.

TABLE IV

|  | Ex. 8 | Ex. 9 | Ex. 10 | Ex. 11 | Ex. 12 | Ex. 13 |
|---|---|---|---|---|---|---|
| Wt. % $Fe_2O_3$ | 0.600 | 0.700 | 0.800 | 1.000 | 1.100 | 1.200 |
| Wt. % FeO | 0.106 | 0.127 | 0.151 | 0.187 | 0.239 | 0.247 |
| $Fe^{+2}/Fe^{+3}$ | 0.245 | 0.252 | 0.266 | 0.262 | 0.318 | 0.297 |
| Wt. % $MnO_2$ | 0.6 | 0.6 | 0.6 | 0.6 | 0.6 | 0.6 |
| % LTA | 79.8 | 77.4 | 74.9 | 71.9 | 67.5 | 64.9 |
| % UV | 40.1 | 35.1 | 30.9 | 24.5 | 21.0 | 18.5 |
| % IR | 44.4 | 38.8 | 33.0 | 26.2 | 19.0 | 17.9 |
| % TSET | 59.6 | 55.3 | 50.9 | 45.1 | 39.0 | 37.5 |
| Dom. Wavelength | 550.6 | 550.9 | 549.8 | 551.8 | 548.0 | 549.3 |
| % Excitation Purity | 3.3 | 4.0 | 4.5 | 5.8 | 5.9 | 6.7 |

The results of Table IV, for present invention glass compositions, demonstrate that, in glasses with a constant $MnO_2$ wt. % (concentration), increasing the $Fe_2O_3$, correspondingly increases the ultra violet absorption. Table IV also shows that at a given concentration of $MnO_2$, the dominant wavelength (color) tends to be consistent. The data of Example 5 (Table III) can also be viewed to fit between Examples 10 and 11 in Table IV.

Table V demonstrates the ultra violet absorption improvements attained when both $MnO_2$ and $Fe_2O_3$ are steadily increased.

TABLE V

|  | Ex. 14 | Ex. 15 | Ex. 16 | Ex. 17 | Ex. 18 | Ex. 19 |
|---|---|---|---|---|---|---|
| Wt. % $Fe_2O_3$ | 0.900 | 0.920 | 0.960 | 1.050 | 1.200 | 1.500 |
| Wt. % FeO | 0.203 | 0.199 | 0.202 | 0.203 | 0.247 | 0.280 |
| $Fe^{+2}/Fe^{+3}$ | 0.334 | 0.317 | 0.305 | 0.273 | 0.297 | 0.262 |
| Wt. % $MnO_2$ | 0.0 | 0.1 | 0.2 | 0.4 | 0.8 | 1.0 |
| % LTA | 73.0 | 72.4 | 71.1 | 70.0 | 63.9 | 56.8 |
| % UV | 37.0 | 34.4 | 31.2 | 25.2 | 16.1 | 7.1 |
| % IR | 24.0 | 24.3 | 23.8 | 23.6 | 17.8 | 14.4 |
| % TSET | 45.9 | 45.6 | 44.5 | 43.4 | 36.7 | 30.7 |
| Dom. Wavelength | 502.5 | 507.8 | 516.6 | 541.8 | 554.3 | 562.5 |
| % Excitation Purity | 2.9 | 2.6 | 2.5 | 4.4 | 8.6 | 17.5 |

Example 19 from Table V represents the highest concentration of $Fe_2O_3$ considered in these embodiments of the present invention because the color of the glass is so intense as witnessed by the high 17.5% excitation purity. The reproducibility of the melting conditions and resultant glass properties is seen by comparing Example 1 (Table III) and Example 14 (Table V) which have the same concentration of both $MnO_2$ and $Fe_2O_3$.

Table VI below demonstrates the further improvement in spectral properties resulting from the addition of titanium dioxide to glass compositions containing both $MnO_2$ and $Fe_2O_3$. There are also two comparative examples, not according to the present invention, Examples 20 and 21. Note that in Example 21 when not employing manganese dioxide, that the ratio of $Fe^{+2}/Fe^{+3}=0.358$ which is above the 0.35 required in the present invention. Example 20 was included to show that addition of a small quantity of $TiO_2$ can also shift iron toward its oxidized form but it also undesirably starts to reduce iron as the amount of $TiO_2$ is increased. As also shown by comparing these examples with Examples 23 & 25, $MnO_2$ oxidizes the iron while $TiO_2$ slightly reduces the iron.

Table VI further demonstrates the value of manganese dioxide and the additional improvements in the ultra violet absorption that a manganese compound provides to the glass composition.

TABLE VI

|  | Ex. 20 | Ex. 21 | Ex. 22 | Ex. 23 | Ex. 24 | Ex. 25 |
|---|---|---|---|---|---|---|
| Wt. % $Fe_2O_3$ | 0.900 | 0.900 | 0.900 | 0.900 | 0.900 | 0.900 |
| Wt. % FeO | 0.205 | 0.214 | 0.193 | 0.201 | 0.178 | 0.188 |
| $Fe^{+2}/Fe^{+3}$ | 0.339 | 0.358 | 0.314 | 0.329 | 0.282 | 0.303 |
| Wt. % $MnO_2$ | 0.0 | 0.0 | 0.1 | 0.1 | 0.3 | 0.3 |
| Wt. % $TiO_2$ | 0.1 | 0.4 | 0.1 | 0.4 | 0.1 | 0.4 |
| % LTA | 71.6 | 70.2 | 72.6 | 71.7 | 73.1 | 71.7 |
| % UV | 35.3 | 31.3 | 33.6 | 30.1 | 30.5 | 27.2 |
| % IR | 23.6 | 22.3 | 25.3 | 24.2 | 27.8 | 26.0 |
| % TSET | 44.8 | 43.2 | 46.1 | 44.7 | 47.4 | 45.4 |
| Dom. Wavelength | 511.3 | 532.6 | 515.3 | 534.0 | 537.8 | 545.9 |
| % Excitation Purity | 2.3 | 3.1 | 2.3 | 3.3 | 3.3 | 4.6 |

Table VII below indicates the improved UV absorption resulting from the use of cerium oxide together with both $MnO_2$ and $Fe_2O_3$. Cerium oxide by itself does not sufficiently increase the ultra violet absorption to an acceptable level, but as manganese dioxide increases, the ultra violet absorption dramatically increases. Including, e.g., 0.4 wt. % $CeO_2$ as an additive in a batch increases the cost of the batch more than 50%. Hence, it is much more commercially desirable to be able to use the much less expensive manganese compound to improve the ultraviolet light absorption and then add in only a small quantity of cerium oxide if further improvement of UV absorption is desired. This is in contrast to the commercially undesirable alternative of using only cerium oxide to provide the same total ultraviolet absorption improvement to the glass composition. This can be seen by comparing Examples 27 and 28 which use the same amount of iron oxide colorant. Even better UV absorption is achieved with significantly less cerium oxide through the use of manganese dioxide.

TABLE VII

|  | Ex. 26 | Ex. 27 | Ex. 28 | Ex. 29 | Ex. 30 | Ex. 31 |
|---|---|---|---|---|---|---|
| Wt. % $Fe_2O_3$ | 0.900 | 0.900 | 0.900 | 0.900 | 0.900 | 0.900 |
| Wt. % FeO | 0.205 | 0.194 | 0.187 | 0.195 | 0.179 | 0.184 |
| $Fe^{+2}/Fe^{+3}$ | 0.339 | 0.315 | 0.300 | 0.316 | 0.284 | 0.294 |
| Wt. % $MnO_2$ | 0.0 | 0.0 | 0.1 | 0.1 | 0.3 | 0.3 |
| Wt. % $CeO_2$ | 0.1 | 0.4 | 0.1 | 0.4 | 0.1 | 0.4 |
| % LTA | 72.0 | 72.6 | 73.3 | 72.4 | 72.8 | 72.5 |
| % UV | 35.4 | 33.3 | 33.7 | 31.2 | 30.8 | 28.4 |
| % IR | 23.5 | 25.4 | 26.2 | 24.9 | 27.5 | 26.7 |
| % TSET | 45.1 | 46.3 | 47.0 | 45.7 | 47.1 | 46.5 |
| Dom. Wavelength | 503.9 | 512.0 | 512.5 | 511.9 | 529.7 | 535.6 |
| % Excitation Purity | 2.8 | 2.2 | 2.3 | 2.4 | 2.8 | 3.2 |

Table VIII below shows the improvement in ultraviolet absorption of glasses when iron oxide, manganese dioxide, cerium oxide, and titanium dioxide are used in combination.

TABLE VIII

|  | Ex. 32 | Ex. 33 | Ex. 34 | Ex. 35 | Ex. 36 | Ex. 37 |
|---|---|---|---|---|---|---|
| Wt. % $Fe_2O_3$ | 0.900 | 0.900 | 0.900 | 0.900 | 0.900 | 0.900 |
| Wt. % FeO | 0.168 | 0.154 | 0.184 | 0.195 | 0.179 | 0.195 |
| $Fe^{+2}/Fe^{+3}$ | 0.261 | 0.236 | 0.294 | 0.316 | 0.284 | 0.316 |
| Wt. % $MnO_2$ | 0.1 | 0.3 | 0.1 | 0.3 | 0.1 | 0.3 |
| Wt. % $CeO_2$ | 0.4 | 0.4 | 0.1 | 0.1 | 0.4 | 0.4 |
| Wt. % $TiO_2$ | 0.1 | 0.1 | 0.4 | 0.4 | 0.4 | 0.4 |
| % LTA | 73.9 | 74.3 | 72.6 | 71.3 | 72.5 | 71.1 |
| % UV | 29.7 | 26.9 | 29.0 | 26.1 | 26.4 | 23.7 |
| % IR | 29.7 | 32.2 | 26.7 | 25.0 | 27.6 | 24.9 |
| % TSET | 48.8 | 50.0 | 46.5 | 44.7 | 46.7 | 44.4 |
| Dom. Wavelength | 536.7 | 551.3 | 541.4 | 547.7 | 548.0 | 549.5 |
| % Excitation Purity | 3.0 | 4.7 | 3.7 | 4.9 | 4.5 | 5.3 |

The commercial value of the present invention can be readily seen by comparing Example 37 (Table VIII) with Example 11 (Table IV). The spectral properties (UV and IR) are almost the same but by using slightly more total iron as $Fe_2O_3$ and also $Mno_2$, the use of costly $TiO_2$ additive and $CeO_2$ additive is avoided. This represents a significant cost saving while obtaining the same desirable glass.

Both chromium oxide and vanadium pentoxide absorb in the ultra violet portion of the spectrum and could also be used in addition to manganese dioxide and iron oxide demonstrated in this invention. Chromium oxide absorbs in the both the ultra violet and in the visible portion of the spectrum so that chromium oxide optimally would be limited to 0 to 0.2 wt. % when used in combination with manganese dioxide and iron oxide in the present invention composition. Vanadium pentoxide could also be used to further enhance the ultra violet absorption when used in combination with manganese dioxide and iron oxide of the present invention. The use of vanadium pentoxide of this invention would optimally be limited to the range of 0 to 1.0 wt. %

It should be noted that none of the glass compositions made according to the present invention examples used sodium nitrate as a component. It is unexpected and most desirable that the iron oxide can be oxidized using only manganese compounds without the need for any sodium nitrate to provide oxidizing conditions. The fact that the manganese compounds like manganese dioxide are relatively inexpensive provides further commercial desirability to the present invention. Being able to oxidize iron oxide to improve UV absorption while maintaining high visible transmission, since the reduced manganese compound becomes less colored, adds to the unexpected and desirable aspects of the invention.

Glass compositions made according in the present invention can be used for both automotive and architectural applications. Present federal automotive regulations require a minimum of 70.0% LTA measured at the actual glass thickness. The glass is expected to maintain this LTA throughout the useful life of the vehicle. Glasses containing manganese and iron oxides have been known to solarize or discolor when exposed to a strong ultra violet light source. Glasses of the present invention, having the critical parameters defined herein (i.e., including the $Fe^{+2}/Fe^{+3}$ ratio), have been found not to experience any appreciable solarization. Examples 14 through 19 from Table V above were exposed to accelerated 500 hour test in an Atlas, Model Ci65 Weatherometer using a Xenon UV lamp. This 500 hour exposure is equivalent to a 1 year real time exposure to the sun in Arizona. Results of the exposure of the glasses are listed in Table IX.

TABLE IX

|  | Ex. 14 | Ex. 15 | Ex. 16 | Ex. 17 | Ex. 18 | Ex. 19 |
|---|---|---|---|---|---|---|
| Orig. % LTA | 73.0 | 72.4 | 71.1 | 70.0 | 63.9 | 56.8 |
| After 500 h. % LTA | 72.8 | 72.3 | 71.0 | 69.9 | 63.8 | 56.3 |
| Change in % LTA | 0.2 | 0.1 | 0.1 | 0.1 | 0.1 | 0.5 |
| Orig. Dom. Wavelength | 502.5 | 507.8 | 516.6 | 541.8 | 554.3 | 562.5 |
| After 500 h. Dom. Wavelength | 500.9 | 506.0 | 514.6 | 541.2 | 554.0 | 562.7 |
| Change in | 1.6 | 1.8 | 2.0 | 0.6 | 0.3 | −0.2 |

TABLE IX-continued

|  | Ex. 14 | Ex. 15 | Ex. 16 | Ex. 17 | Ex. 18 | Ex. 19 |
|---|---|---|---|---|---|---|
| Dom. Wavelength |  |  |  |  |  |  |
| Orig. % Excitation Purity | 2.9 | 2.6 | 2.5 | 4.4 | 8.6 | 17.5 |
| After 500 h. % Excitation Purity | 3.1 | 2.7 | 2.5 | 4.2 | 8.3 | 17.4 |
| Change in % Excitation Purity | −0.2 | −0.1 | 0.0 | 0.2 | 0.3 | 0.1 |

The changes in dominant wavelength and % excitation purity is not considered significant for any of the glasses in Table IX above. The results seen in Example 14 above are especially important to interpreting the results shown in the table. It should be noticed that the Example 14 is a control composition, not within the present invention, since it contains 0.90 wt. % $Fe_2O_3$ but no manganese dioxide. Even without any manganese dioxide, this glass still exhibits small difference in the optical properties (LTA) similar to those experienced with Examples 15 through 19. These results of Table IX show the resistance to solorarization of the present invention compositions with a manganese compound. The % LTA change for Examples 14 through 18 are within the experimental error of the equipment while that of Example 19 does show a measurable difference. This measurable difference is considered insignificant to any detrimental effect on the long term spectral properties of the glass.

We claim:

1. A green ultra violet absorbing glass composition having a base glass composition comprising by weight: 68 to 75% $SiO_2$, 10 to 18% $Na_2O$, 5 to 15% CaO, 0 to 10% MgO, 0 to 5% $Al_2O_3$, and 0 to 5% $K_2O$, where CaO+MgO is 6 to 15% and $Na_2O+K_2O$ is 10 to 20%; and colorants consisting essentially of: greater than 0.5 to 1.5 wt. % total iron oxide as $Fe_2O_3$, wherein the weight ratio of $Fe^{+2}/Fe^{+3}$ is less than 0.35; 0.10 to 2.00 wt. % manganese compound as $MnO_2$; and optionally any of: up to 1.00 wt. % titanium oxide as $TiO_2$; up to 1.00 wt. % cerium oxide as $CeO_2$; up to 1.00 wt. % vanadium oxide as $V_2O_5$; and up to 0.20 wt. % chromium oxide as $Cr_2O_3$; the glass having at a 4.0 mm. thickness: 55 to 80% light transmittance using Illuminant A with less than 46% ultra violet transmittance measured over the range of 300 to 400 nanometers.

2. A green glass composition according to claim 1 wherein the dominant wavelength is between 500 and 570 nanometers.

3. A green colored glass composition according to claim 1 wherein the amount of said total iron expressed as $Fe_2O_3$ is within the range of 0.7 to 1.2 wt. %.

4. A green glass composition according to claim 1 wherein the amount of manganese compound expressed as $MnO_2$ is 0.2 to 0.8 wt. %.

5. A green glass composition according to claim 1 wherein the amount of $TiO_2$ is in the range of 0.1 to 0.5 wt. %.

6. A green glass composition according to claim 1 wherein the amount of $CeO_2$ is in the range of 0.1 to 0.5 wt. %.

7. An automotive or architectural glass made from the composition of claim 1 wherein the glass was floated on a molten tin bath.

8. An automotive or architectural glazing made from the composition of claim 1.

9. A method for improving the ultraviolet light absorption while maintaining high visible light transmittance of a soda-lime-silica green glass composition using iron oxide as a colorant by including a manganese compound along with the iron oxide during melt processing of the glass composition, the method comprising the steps of:

admixing and melting together components in quantities sufficient to form said green glass composition having a base glass composition comprising by weight: 68 to 75% $SiO_2$, 10 to 18% $Na_2O$, 5 to 15% CaO, 0 to 10% MgO, 0 to 5% $Al_2O_3$, and 0 to 5% $K_2O$, where CaO+MgO is 6 to 15% and $Na_2O+K_2O$ is 10 to 20%, and colorants consisting essentially of: greater than 0.5 to 1.5 wt. % total iron oxide as $Fe_2O_3$, wherein the weight ratio of $Fe^{+2}/Fe^{+3}$ is less than 0.35; 0.10 to 2.00 wt. % manganese compound as $MnO_2$; and optionally any of: up to 1.00 wt. % titanium oxide as $TiO_2$; up to 1.00 wt. % cerium oxide as $CeO_2$; up to 1.00 wt. % vanadium oxide as $V_2O_5$; and up to 0.20 wt. % chromium oxide as $Cr_2O_3$; the green glass having at a 4.0 mm. thickness: 55 to 80% light transmittance using Illuminant A, and less than 46% ultra violet transmittance measured over the range of 300 to 400 nanometers.

10. The method according to claim 9, wherein the dominant wavelength is between 500 and 570 nanometers.

11. The method according to claim 9, wherein the amount of said total iron expressed as $Fe_2O_3$ is within the range of 0.7 to 1.2 wt. %.

12. The method according to claim 9, wherein the amount of manganese compound expressed as $MnO_2$ is 0.2 to 0.8 wt. %.

13. The method according to claim 9, wherein the amount of $TiO_2$ is in the range of 0.1 to 0.5 wt. %.

14. The method according to claim 9, wherein the amount of $CeO_2$ is in the range of 0.1 to 0.5 wt. %.

15. An automotive or architectural glass made according to the method of claim 9, wherein the glass was floated on a molten tin bath.

16. The method according to claim 9, where the melt processing excludes the use of sodium nitrate.

17. A green ultra violet absorbing glass composition comprising by weight: 68 to 75% $SiO_2$, 10 to 18% $Na_2O$, 5 to 15% CaO, 0 to 10% MgO, 0 to 5% $Al_2O_3$, and 0 to 5% $K_2O$, where CaO+MgO is 6 to 15% and $Na_2O+K_2O$ is 10 to 20%; and colorants consisting essentially of: greater than 0.5 to 1.5 wt. % total iron oxide as $Fe_2O_3$, wherein the weight ratio of $Fe^{+2}/Fe^{+3}$ is less than 0.35; 0.10 to 2.00 wt. % manganese compound as $MnO_2$; and 0 to 1.00 wt. % titanium oxide as $TiO_2$; the glass having at a 4.0 mm. thickness: 55 to 80% light transmittance using Illuminant A with less than 46% ultra violet transmittance measured over the range of 300 to 400 nanometers.

18. The green glass composition according to claim 17 wherein the dominant wavelength is between 500 and 570 nanometers.

19. A green colored glass composition according to claim 17 wherein the amount of said total iron expressed as $Fe_2O_3$ is within the range of 0.7 to 1.2 wt. %.

20. A green glass composition according to claim 17 wherein the amount of manganese compound expressed as $MnO_2$ is 0.2 to 0.8 wt. %.

21. A green glass composition according to claim 17 wherein the amount of $TiO_2$ is in the range of about 0.02 to 1.0 wt. %.

22. A green glass composition according to claim 21 wherein the amount of $TiO_2$ is in the range of 0.1 to 0.5 wt. %.

23. An automotive or architectural glass made from the composition of claim 17 wherein the glass was floated on a molten tin bath.

24. An automotive or architectural glazing made from the composition of claim 17.

25. A method for improving the ultraviolet light absorption while maintaining high visible light transmittance of a soda-lime-silica green glass composition using iron oxide as a colorant by including a manganese compound along with the iron oxide during melt processing of the glass composition, the method comprising the steps of:

admixing and melting together components in quantities sufficient to form said green glass composition having a base glass composition comprising by weight: 68 to 75% $SiO_2$, 10 to 18% $Na_2O$, 5 to 15% CaO, 0 to 10% MgO, 0 to 5% $Al_2O_3$, and 0 to 5% $K_2O$, where CaO+MgO is 6 to 15% and $Na_2O+K_2O$ is 10 to 20%, and colorants consisting essentially of: greater than 0.5 to 1.5 wt. % total iron oxide as $Fe_2O_3$, wherein the weight ratio of $Fe^{+2}/Fe^{+3}$ is less than 0.35; 0.10 to 2.00 wt. % manganese compound as $MnO_2$; and 0 to 1.00 wt. % titanium oxide as $TiO_2$; the green glass having at a 4.0 mm. thickness: 55 to 80% light transmittance using Illuminant A, and less than 46% ultra violet transmittance measured over the range of 300 to 400 nanometers.

26. The method according to claim 25, wherein the dominant wavelength is between 500 and 570 nanometers.

27. The method according to claim 25, wherein the amount of said total iron expressed as $Fe_2O_3$ is within the range of 0.7 to 1.2 wt. %.

28. The method according to claim 25, wherein the amount of manganese compound expressed as $MnO_2$ is 0.2 to 0.8 wt. %.

29. The method according to claim 25, wherein the amount of $TiO_2$ is in the range of about 0.02 to 1.0 wt. %.

30. The method according to claim 29, wherein the amount of $TiO_2$ is in the range of 0.1 to 0.5 wt. %.

31. An automotive or architectural glass made according to the method of claim 25 wherein the glass was floated on a molten tin bath.

32. The method according to claim 25 where the melt processing excludes the use of sodium nitrate.

* * * * *